US008756388B2

(12) United States Patent　　(10) Patent No.: US 8,756,388 B2
McClure　　(45) Date of Patent: *Jun. 17, 2014

(54) DYNAMIC VOLUME COMPARE FOR ASYNCHRONOUS REMOTE COPY VERIFICATION

(71) Applicant: International Business Machines Corporation, Armonk, NY (US)

(72) Inventor: Alan G. McClure, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/747,948

(22) Filed: Jan. 23, 2013

(65) Prior Publication Data

US 2013/0138610 A1　　May 30, 2013

Related U.S. Application Data

(63) Continuation of application No. 12/105,119, filed on Apr. 17, 2008, now Pat. No. 8,386,729.

(51) Int. Cl.
　　*G06F 12/16*　　(2006.01)
(52) U.S. Cl.
　　USPC .......................................... 711/162; 707/610
(58) Field of Classification Search
　　USPC .......................................... 711/162; 707/610
　　See application file for complete search history.

(56) References Cited

U.S. PATENT DOCUMENTS

| | | | |
|---|---|---|---|
| 6,405,294 | B1 | 6/2002 | Hayter |
| 6,901,414 | B2 | 5/2005 | West et al. |
| 7,124,258 | B2 | 10/2006 | Nakayama et al. |
| 7,237,079 | B2 | 6/2007 | Kaneda et al. |
| 7,577,957 | B1 | 8/2009 | Kamvysselis et al. |
| 2003/0177322 | A1 | 9/2003 | Crockett et al. |
| 2005/0193244 | A1 | 9/2005 | Stager et al. |
| 2005/0193272 | A1 | 9/2005 | Stager et al. |
| 2005/0278388 | A1 | 12/2005 | Butterworth et al. |
| 2006/0005074 | A1 | 1/2006 | Yanai et al. |
| 2006/0053182 | A1 | 3/2006 | Sen et al. |
| 2007/0094467 | A1 | 4/2007 | Yamasaki |
| 2007/0136395 | A1 | 6/2007 | Fries et al. |

*Primary Examiner* — Jared Rutz
(74) *Attorney, Agent, or Firm* — Griffiths & Seaton PLLC (57) ABSTRACT

A method, device, and computer program product for performing asynchronous remote copy verification is provided. An initial track-to-track comparison between a primary and a secondary volume pair is performed. A first predetermined time is waited for. Upon completion of the first predetermined time, a subsequent primary volume track-to-secondary volume track comparison is performed only on the noncompare tracks. A query is performed for determining whether all of the noncompare tracks have been resolved. If any of the noncompare tracks have not been resolved, a query is performed for determining if a predetermined number of iterations of the primary volume track-to-secondary volume track comparison have been performed, and an additional subsequent primary volume track-to-secondary volume track comparison is performed only on unresolved noncompare tracks.

27 Claims, 5 Drawing Sheets

DYNAMIC VOLUME COMPARE FOR ASYNCHRONOUS REMOTE COPY VERIFICATION

CROSS-REFERENCE TO RELATED APPLICATION

This application is a continuation application of U.S. application Ser. No. 12/105,119, filed Apr. 17, 2008, now issued U.S. Pat. No. 8,386,729, the entire contents of which are incorporated herein by reference and is relied upon for claiming the benefit of priority.

BACKGROUND OF THE INVENTION

1. Field of the Invention

The present invention relates in general to computers, and more particularly to apparatus, method and computer program product embodiments for dynamically comparing volumes for asynchronous remote copy verification.

2. Description of the Related Art

In enterprise data processing arrangements, such as may be used in a company, government agency or other entity, information is often stored on servers and accessed by users over, for example, a network. The information may comprise any type of information that of programs and/or data to be processed. Users, using their personal computers, workstations, or the like (generally, "computers") will enable their computers to retrieve information to be processed, and, in addition, to store information, for example, on remote servers.

A computer network of a business may have multiple storage networks that are located remote from one another and a business user. The storage networks may also be hosted on different types of systems. Such storage networks may be useful for clients, for example, to establish a redundant source of data in event of a failure of the primary storage system. Disaster recovery techniques that can tolerate the failure of a complete data center have become increasingly important. A classical technique used for tolerating data center failures is copying the data to a remote site. This technique is known as remote-mirroring. There are various forms of remote-mirroring. They can primarily be classified as either synchronous or asynchronous. Synchronous remote-mirroring techniques delay acknowledging an I/O to a host until it has been executed on the remote site as well. Asynchronous techniques, on the other hand, acknowledge an I/O as soon as it executes on the primary site.

Synchronous remote-mirroring techniques usually have high impact on I/O performance, high bandwidth requirements, zero data loss, and very small time to recovery. Asynchronous remote-mirroring techniques usually have low or no impact on I/O performance, low bandwidth requirements, possibility of data loss, and higher time to recovery. Asynchronous mirroring techniques can be classified further along two dimensions, including write-ordering and write-coalescing. Write-ordering is focused on maintaining the order of writes at the remote mirror. Write-coalescing is focused on coalescing multiple writes to the same block (at the mirror) into one write. Write coalescing reduces bandwidth requirements when write-locality exists.

Clients who use remote mirroring functionality of their disk storage for disaster recovery may wish to verify that the copy of the data is correct. Traditionally, such verification is performed by comparing data between the "primary" volume and "secondary" volumes.

SUMMARY OF THE INVENTION

While basic comparison between primary and secondary volumes may be effective in some cases, updates to the secondary volume in asynchronous mirroring technologies such as Extended Remote Copy (XRC) may lag those to the primary volume by times ranging from several seconds to several minutes. Therefore, in order to perform the verification, the client must stop updates to the primary volumes, wait for the secondary volume to catch up, and then perform the volume-to-volume compares.

For most clients, production outages such as those described above are unacceptable. For those who may tolerate an occasional slowdown or stoppage, the extra time required to perform volume-to-volume comparisons is prohibitively long, making the technique impractical. A need exists for a more effective mechanism for performing asynchronous remote copy verification.

Accordingly, in one embodiment, by way of example only, a method for performing asynchronous remote copy verification is provided. An initial track-to-track comparison between a primary and a secondary volume pair is performed. A first predetermined time is waited for. Upon completion of the first predetermined time, a subsequent primary volume track-to-secondary volume track comparison is performed only on the noncompare tracks. A query is performed for determining whether all of the noncompare tracks have been resolved. If any of the noncompare tracks have not been resolved, a query is performed for determining if a predetermined number of iterations of the primary volume track-to-secondary volume track comparison have been performed, and an additional subsequent primary volume track-to-secondary volume track comparison is performed only on unresolved noncompare tracks.

In another embodiment, again by way of example only, a device for performing asynchronous remote copy verification is provided. A verification module is adapted for performing an initial track-to-track comparison between a primary and a secondary volume pair is performed. A first predetermined time is waited for. Upon completion of the first predetermined time, a subsequent primary volume track-to-secondary volume track comparison is performed only on the noncompare tracks. A query is performed for determining whether all of the noncompare tracks have been resolved. If any of the noncompare tracks have not been resolved, a query is performed for determining if a predetermined number of iterations of the primary volume track-to-secondary volume track comparison have been performed, and an additional subsequent primary volume track-to-secondary volume track comparison is performed only on unresolved noncompare tracks.

In still another embodiment, again by way of example only, a computer program product for asynchronous remote copy verification is provided. The computer program product comprises a computer-readable storage medium having computer-readable program code portions stored therein. The computer-readable program code portions include a first executable portion that performs an initial track-to-track comparison between a primary and a secondary volume pair is performed. A first predetermined time is waited for. Upon completion of the first predetermined time, a subsequent primary volume track-to-secondary volume track comparison is performed only on the noncompare tracks. A query is performed for determining whether all of the noncompare tracks have been resolved. If any of the noncompare tracks have not been resolved, a query is performed for determining if a predetermined number of iterations of the primary volume track-to-secondary volume track comparison have been performed, and an additional subsequent primary volume trackto-secondary volume track comparison is performed only on unresolved noncompare tracks.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for performing asynchronous remote copy verification of data. The verification mechanisms are facilitated by the functionality of a verification module, as will be further described. The verification module is operable on the storage computing environment.

The verification mechanisms as will be described below may be configured to perform a dynamic comparison of the primary and secondary volumes while in an active asynchronous remote copy session. The comparison (or "compare") may be based on the premise that if a data unit on a volume (such as a particular track, or a record on the track) can be shown to compare with, or correspond to, a mirrored volume at any point in time, then mirroring for that unit may be then validated. If a data unit does not compare, the validation may be retried at a later point in time, and is likely to be successful. Once all data units on the volume have been validated, then the entire volume may be considered to be correct.

The technique of performing a dynamic comparison serves to alleviate delays and outages associated with conventional techniques previously described. Further the mechanisms as will be described may be implemented across a wide variety of systems, hardware, platforms, and the like.

Figure 1:
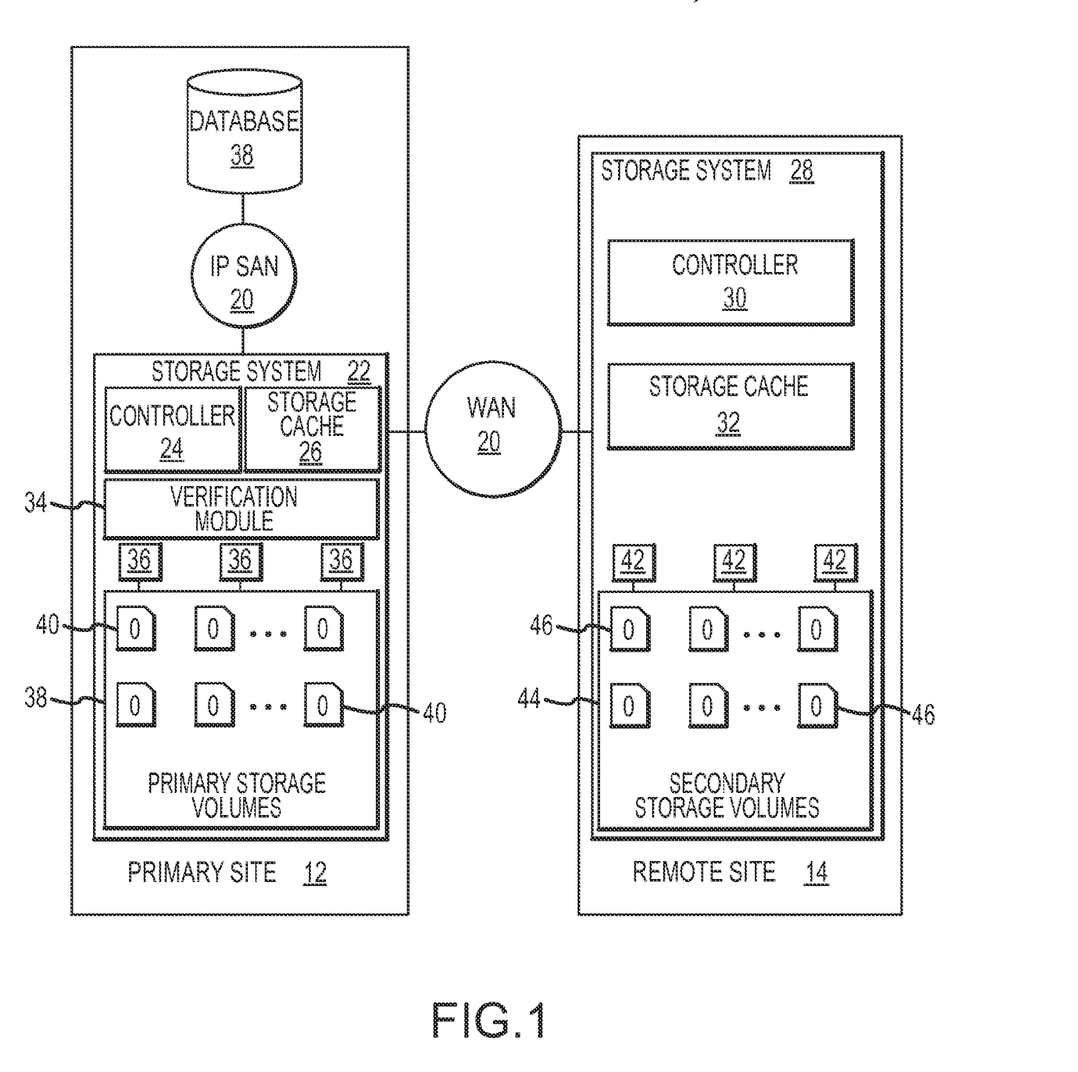
FIG. 1 shows a functional block diagram of an exemplary distributed database system that can utilize the asynchronous remote copy verification mechanisms according to the present invention.

FIG. 1 hereafter provides an example of a computer storage environment in which the mechanisms of the following embodiments may be implemented. It should be appreciated, however, that FIG. 1 is only exemplary and is not intended to state or imply any limitation as to the particular architectures in which the exemplary aspects of the various embodiments may be implemented. Many modifications to the architecture depicted in FIG. 1 may be made without departing from the scope and spirit of the following description and claimed subject matter.

FIG. 1 shows a functional block diagram of an exemplary distributed database system 10 that can utilize the verification mechanisms according to the present invention. Distributed database system 10 includes a primary site 12 that is coupled to at least one remote site 14 over a telecommunications network, such as Wide Area Network (WAN) 16 or the Internet. While only one remote site 14 is shown in FIG. 1, it should be understood that distributed database system 10 can include more than one remote site. Primary site 12 includes an application, such as a database 18, a Storage Area Network (SAN) 20 and a storage system 22. Storage system 22 includes at least one mass storage device, such as Hard Disk Drives (HDD) 36, a controller 24 that informs a storage cache 26 about the volumes and files forming the primary storage volumes 40 associated with database 18. The primary storage volumes 40 are integrated into a storage subsystem 38 as shown. Each primary storage volume 40 may be grouped or organized physically and/or logically. As one skilled in the art will appreciate, a wide variety of configurations of drive devices, volumes, and the like may be contemplated.

Remote site 14 includes a storage system 28. Storage system 28 includes at least one mass storage device, such as an HDD 42, a controller 30 and a storage cache 32. Here, as in storage system 22, the HDDs 42 are coupled to a storage subsystem 44 housing a plurality of secondary storage volumes 46. Storage systems 22 and 28 each separately store log records and data records in their primary and secondary storage volumes 40 and 46, respectively. A verification module 34 is operational on the storage system 22. The functionality of the verification module is further described below. Verification module may be adapted or configured to perform various tasks in furtherance of the verification methodologies according to the present invention. The skilled artisan will appreciate that verification module may be implemented, in whole or in part, elsewhere in the database system 10 or elsewhere as a particular situation warrants.

Figure 2:
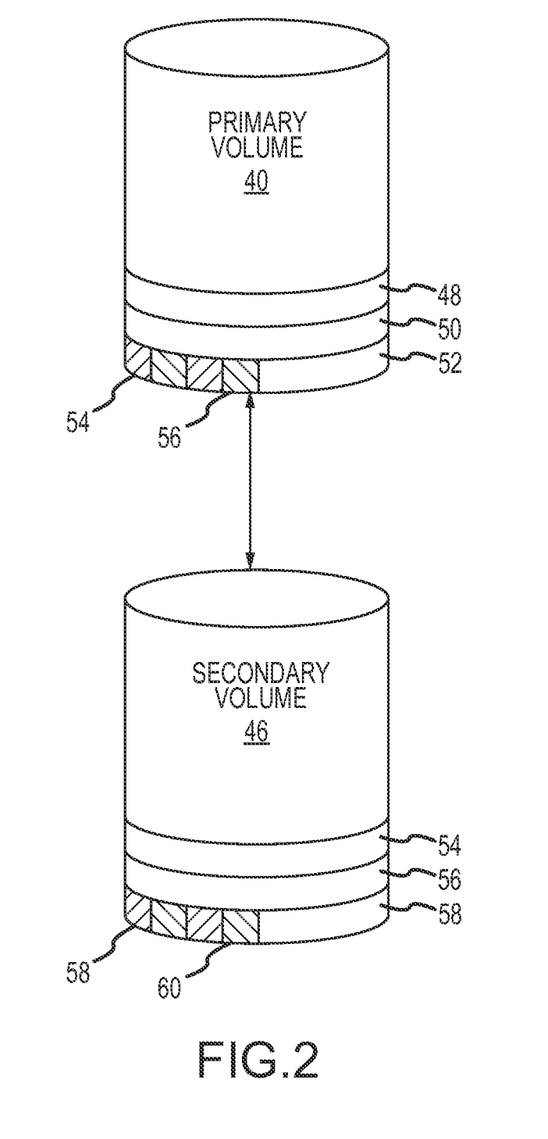
FIG. 2 shows an exemplary primary and secondary volume, including exemplary tracks and records associated with the volumes.

Turning to FIG. 2, an exemplary primary volume 40 and secondary volume 46 is depicted to illustrate a track-by-track comparison, and a record-by-record comparison. As is seen, primary volume contains a plurality of tracks, such as tracks 48, 50, and 52. Associated with each track are a plurality of records, such as records 54 and 56 as part of track 52. In similar fashion, secondary volume 46 is shown having tracks 54, 56, and 58, with associated records 58 and 60 as part of track 58.

To verify data coped to the remote site, a comparison may be made between tracks located on the primary volume 40 and tracks written to the secondary volume 46. The primary volume tracks may be compared to the secondary volume tracks to identify any differences between the two tracks. If differences are found, the differences may be referred to as "noncompare tracks." In addition to comparing a track on the primary volume with a copy written to the secondary volume, various records in an associated track may be compared against the same associated records on the secondary volume.

In light of the foregoing, portions of the verification mechanisms according to the present invention may operate as follows. These verification mechanisms may be executed, at least in part, by the verification module 34 operational on storage system 22 (FIG. 1). An initial track-to-track compare between a primary and secondary volume pair is performed, and tracks with differences are noted. After an arbitrary time period, the compare is repeated. In the subsequent compare, only the set of noncompare tracks is analyzed. The sequence of wait and recompare is repeated for an arbitrary number of iterations or until all noncompares are resolved. For persistent noncompares, the difference may be due to a highly volatile track. For these tracks, a record level compare can be initiated within the track, using the same verify-wait-recompare logic as that employed for the initial track compare. If, after an arbitrary number of interations, there are still persistent noncompares, the volume is considered to have failed verification and the location and detail of the noncompare data is reported.

In view of the exemplary methodology described above, FIG. 3 illustrates a first exemplary method 62 for performing asynchronous remote copy verification. As one skilled in the art will appreciate, various steps in the method 300 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. In addition and as previously described, while the method 300 relates specifically to point-in-time copy functionality, various steps in the method 300 may be adapted for provisioning of storage in other scenarios and implementations.

Figure 3:
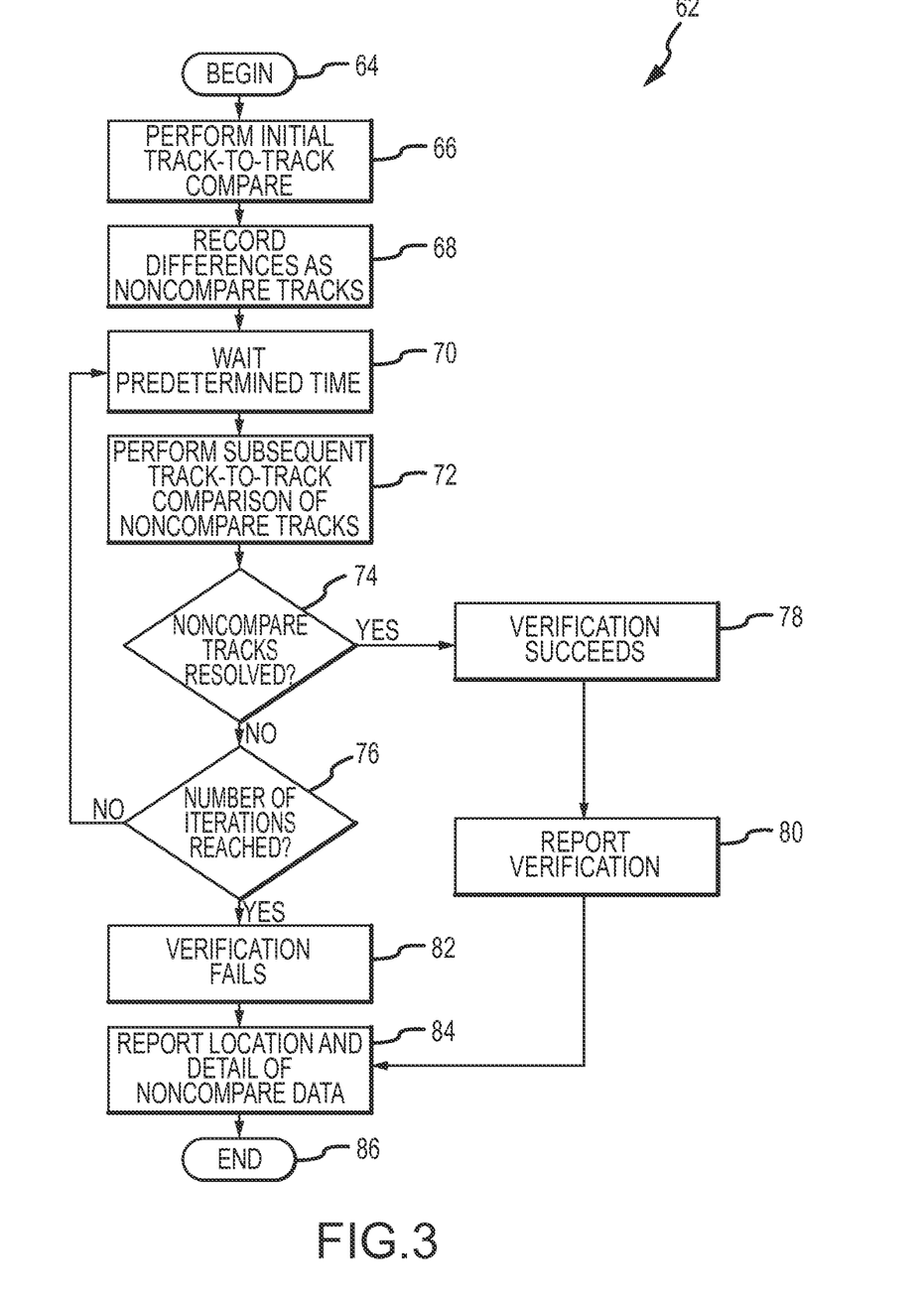
FIG. 3 illustrates a first exemplary method for performing asynchronous remote copy verification.

Method 62 begins (step 64) by performing an initial track-to-track comparison (step 66). A track on the primary volume is compared to a track on the secondary volume. Differences between the two tracks are recorded as noncompare tracks (step 68). The method 62 the waits for a predetermined time (step 70). Following the expiration of the predetermined time, the method 62 then performs a subsequent track-to-track comparison of only the noncompare tracks (step 72).

Method 62 then queries if the noncompare tracks have been resolved (step 74). If it is determined that all of the noncompare tracks are not resolved (step 74), the method 62 then queries of a predetermined number of iterations have been reached (step 76). If not, the method then waits an additional predetermined time (again, step 70). Following the expiration of the additional predetermined time, an additional subsequent track-to-track comparison of only the still unresolved noncompare tracks (again, step 72).

If it is determined that all of the noncompare tracks have been resolved (again, step 74), the verification is deemed to have succeeded (step 78). The verification is reported (step 80). However, if after a predetermined number of iterations has expired (again, step 76) leaving unresolved noncompare tracks, those unresolved tracks are deemed to have failed verification (step 82). The location and detail of this noncompare data is reported (step 84). Method 62 then ends (step 86).

Figure 4:
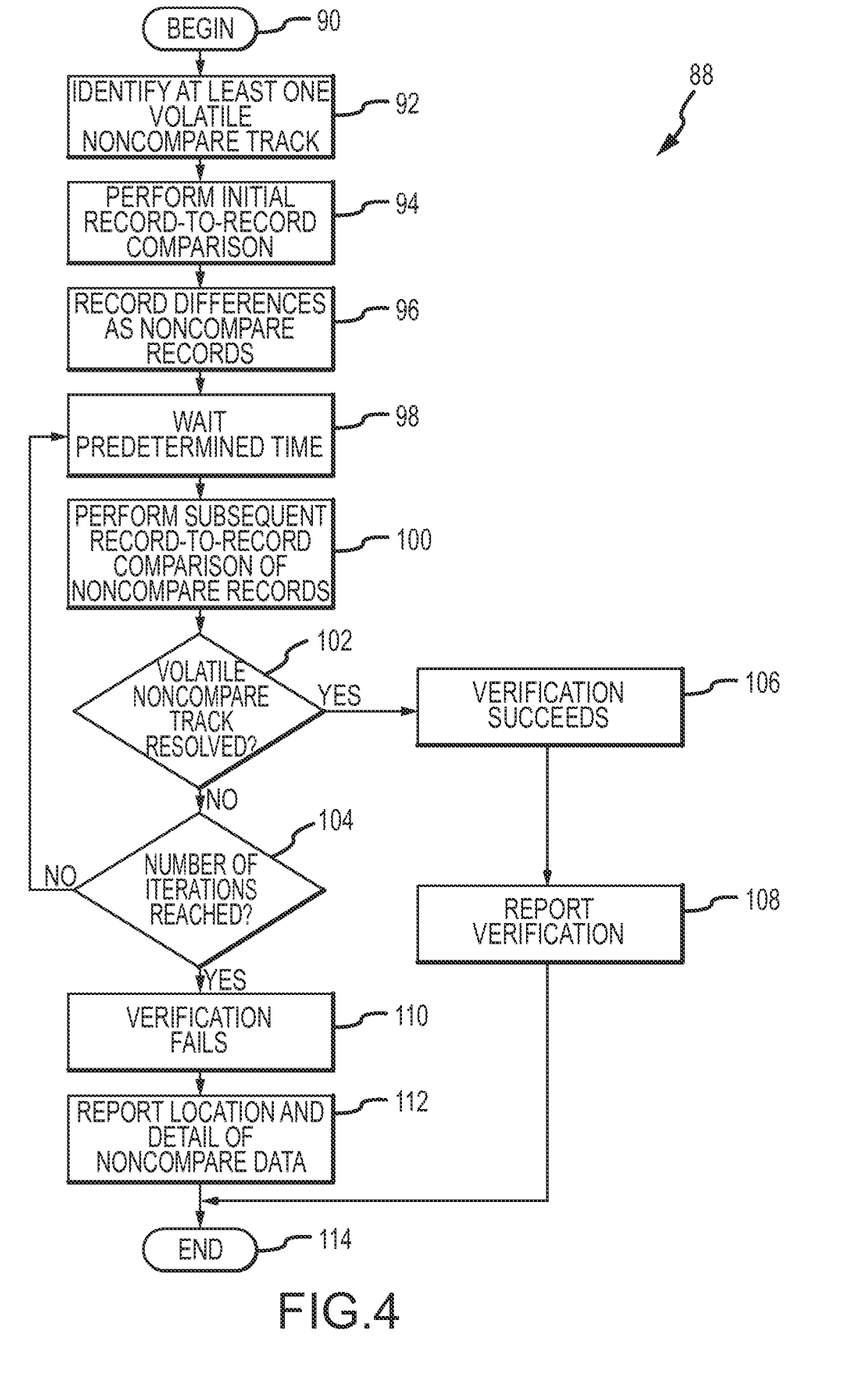
FIG. 4 illustrates a second exemplary method for performing asynchronous remote copy verification.

In some cases, as described above, persistent noncompares may be due to a highly volatile track. Again, for these volatile tracks, a record-level compare may be employed within the track. FIG. 4, following, illustrates a second exemplary method 88 for performing asynchronous remote copy verification in light of the above methodology.

Method 88 begins (step 90) with the identification of at least one volatile noncompare track (step 92). Examining the behavior of the track during the initial track-to-track comparison and subsequent track-to-track comparisons may facilitate the identification of such a volatile track.

Once the volatile track or tracks have been identified, an initial record-to-record comparison is performed (step 94) on records within the volatile track between the primary and secondary volumes. Differences noted between the records may then be recorded as noncompare records (step 96) in similar fashion to the methodology described in FIG. 3, above. Here again, a predetermined time is waited for (step 98). Once the predetermined time has expired, a subsequent record-to-record comparison is performed only on the noncompare records (step 100).

Method 88 then queries whether all of the noncompare records have been resolved (step 102). If not, the method 88 queries whether a predetermined number of iterations have been reached (step 104). If not, the method 88 then waits an additional predetermined time (again, step 98) and performs an additional subsequent record-to-record comparison of the unresolved noncompare records (again, step 100). If the method determines that each of the records on the volatile track have been resolved (again, step 102), then it is determined that verification has succeeded (step 106). The verification is reported (step 108).

If, however, there are remaining unresolved noncompare records following the expiration of the predetermined number of iterations (again, step 104), then verification for those non-compare records fails (step 110). The location and detail of the noncompare data is reported (step 112). The method 88 then ends (step 114).

Highly volatile (persistently volatile) data may present the situation where it is not possible to obtain a match over time for a given record on a primary and secondary track. In such a case there are two options: 1) Temporarily freeze updates to the primary volume, allowing the asynchronous mirror to catch up, and then perform the compare, or 2) Check if the persistent volatile noncompare data in the secondary volume is changing over a predetermined time, which provides evidence that mirroring is active for that volume. While option 1 provides an exact data verification, the required freeze would have the undesirable (and likely unacceptable) effect of degrading production application performance. In such a case, option 2 allows a client to validate that mirroring is active while avoiding application performance impact.

Figure 5:
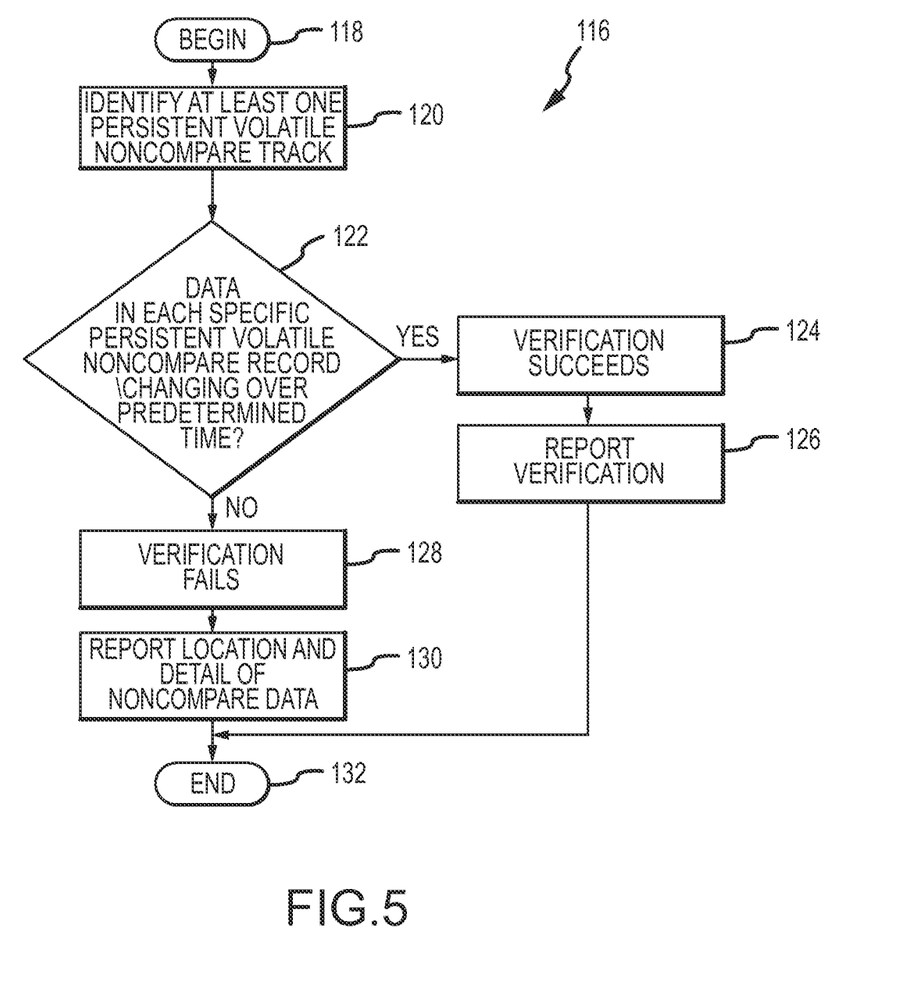
FIG. 5 illustrates a third exemplary method for performing asynchronous remote copy verification.

FIG. 5, following, illustrates an exemplary method 116 for performing asynchronous remote copy verification in light of the above methodology. Method 116 begins with the identification of one or more persistent volatile noncompare tracks (step 120). Again, the noncompare track may be identified, at least in part, by analyzing its behavior during initial track-to-track comparisons and subsequent track-to-track comparisons. Data in each of the specific persistent volatile noncompare records in the secondary volume is checked to determine if the data changes over a predetermined time (step 122). If it is determined that the secondary volume's persistent volatile noncompare data has changed, the determination may be used (possibly along with other indicators) to conclude that the verification is successful (step 124). If, however, the data on the secondary volume is not changing, then verification fails, (step 128), and the location and detail of the noncompare data is reported (step 130). The method 116 then ends (step 132).

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for performing asynchronous remote copy verification, comprising:
    performing an initial primary volume track-to-secondary volume track comparison between a primary and a secondary volume pair;
    waiting a first predetermined time;
    upon completion of the first predetermined time, performing a subsequent primary volume track-to-secondary volume track comparison only on noncompare tracks; and
    performing a query for determining whether all of the noncompare tracks have been resolved, wherein:
        if any of the noncompare tracks have not been resolved:
            performing a query for determining if a predetermined number of iterations of the primary volume track-to-secondary volume track comparison have been performed, and
            performing an additional subsequent primary volume track-to-secondary volume track comparison only on unresolved noncompare tracks.

2. The method of claim 1, further including if all of the noncompare tracks have been resolved, reporting that the asynchronous remote copy verification is successful.

3. The method of claim 2, further including:
    (a) waiting an additional predetermined time, and
    (b) performing an additional subsequent primary volume track-to-secondary volume track comparison of the noncompare tracks.

4. The method of claim 3, further including repeating steps (a) and (b) for a predetermined number of iterations.

5. The method of claim 3, further including repeating steps (a) and (b) until each of the noncompare tracks are resolved.

6. The method of claim 1, further including performing one of:
    recording differences between primary and secondary volume tracks as the noncompare tracks, and
    identifying at least one volatile and at least one persistent volatile noncompare track of the noncompare tracks by analyzing the initial primary volume track-to-secondary volume track comparison and the subsequent primary volume track-to-secondary volume track comparisons.

7. The method of claim 6, wherein identifying the at least one volatile noncompare track of the noncompare tracks by analyzing the initial primary volume track-to-secondary volume track comparison and the subsequent primary volume track-to-secondary volume track comparisons further includes:
    identifying at least one volatile noncompare track of the noncompare tracks by analyzing a additional subsequent primary volume track-to-secondary volume track comparisons,
    performing an initial primary volume record-to-secondary volume record comparison of the at least one volatile noncompare track between the primary and secondary volume pair,
    recording differences between the primary and the secondary volume track records as noncompare records,
    waiting a second predetermined time, and
    performing a subsequent primary volume record-to-primary volume record comparison of the noncompare records.

8. The method of claim 6, wherein the identifying the at least one persistent volatile noncompare track of the noncompare tracks by analyzing the initial primary volume track-to-secondary volume track comparison and the subsequent primary volume track-to-secondary volume track comparisons further includes:
    identifying at least one persistent volatile noncompare record of the noncompare tracks by analyzing a additional subsequent primary volume track-to-primary volume track comparisons, and
    determining if each persistent volatile noncompare record of the at least one persistent volatile noncompare record written to the secondary volume is changing over a second predetermined time, the determining at least partially used to provide verification of the at least one persistent volatile noncompare record.

9. The method of claim 1, further including continuing to perform additional subsequent primary volume record-to-secondary volume record comparisons of the noncompare records after additional second predetermined times until the at least one volatile noncompare track is resolved.

10. A system for performing asynchronous remote copy verification in a computing environment, comprising:
    at least one processor device operable in the computing environment, wherein the least one processor device:
        performs an initial primary volume track-to-secondary volume track comparison between a primary and a secondary volume pair,
        waits a first predetermined time, and
        upon completion of the first predetermined time, performing a subsequent primary volume track-to-secondary volume track comparison only on noncompare tracks, and
        performs a query for determining whether all of the noncompare tracks have been resolved, wherein:
            if any of the noncompare tracks have not been resolved the least one processor device:
                performs a query for determining if a predetermined number of iterations of the primary volume track-to-secondary volume track comparison have been performed, and
                performs an additional subsequent primary volume track-to-secondary volume track comparison only on unresolved noncompare tracks.

11. The system of claim 10, wherein the least one processor device, if all of the noncompare tracks have been resolved, reports that the asynchronous remote copy verification is successful.

12. The system of claim 11, wherein the least one processor device:
    (a) waits an additional predetermined time, and (b) performs an additional subsequent primary volume track-to-secondary volume track comparison of the noncompare tracks.

13. The system of claim 12, wherein the least one processor device repeats steps (a) and (b) for a predetermined number of iterations.

14. The system of claim 12, wherein the least one processor device repeats steps (a) and (b) until each of the noncompare tracks are resolved.

15. The system of claim 10, wherein the least one processor device performs one of:
   recording differences between primary and secondary volume tracks as the noncompare tracks, and
   identifying at least one volatile and at least one persistent volatile noncompare track of the noncompare tracks by analyzing the initial primary volume track-to-secondary volume track comparison and the subsequent primary volume track-to-secondary volume track comparisons.

16. The system of claim 15, wherein the least one processor device, for the identifying the at least one volatile noncompare track of the noncompare tracks by analyzing the initial primary volume track-to-secondary volume track comparison and the subsequent primary volume track-to-secondary volume track comparisons, performs each of:
   identifying at least one volatile noncompare track of the noncompare tracks by analyzing a additional subsequent primary volume track-to-secondary volume track comparisons,
   performing an initial primary volume record-to-secondary volume record comparison of the at least one volatile noncompare track between the primary and secondary volume pair,
   recording differences between the primary and the secondary volume track records as noncompare records,
   waiting a second predetermined time, and
   performing a subsequent primary volume record-to-primary volume record comparison of the noncompare records.

17. The system of claim 15, wherein the least one processor device, for the identifying the at least one persistent volatile noncompare track of the noncompare tracks by analyzing the initial primary volume track-to-secondary volume track comparison and the subsequent primary volume track-to-secondary volume track comparisons, performs each of:
   identifying at least one persistent volatile noncompare record of the noncompare tracks by analyzing a additional subsequent primary volume track-to-primary volume track comparisons, and
   determining if each persistent volatile noncompare record of the at least one persistent volatile noncompare record written to the secondary volume is changing over a second predetermined time, the determining at least partially used to provide verification of the at least one persistent volatile noncompare record.

18. The system of claim 10, wherein the least one processor device continues to perform additional subsequent primary volume record-to-secondary volume record comparisons of the noncompare records after additional second predetermined times until the at least one volatile noncompare track is resolved.

19. A computer program product for performing asynchronous remote copy verification in a computing environment by a processor device, the computer program product comprising a non-transitory computer-readable storage medium having computer-readable program code portions stored therein, the computer-readable program code portions comprising:
   a first executable portion that performs an initial primary volume track-to-secondary volume track comparison between a primary and a secondary volume pair;
   a second executable portion that waits a first predetermined time;
   a third executable portion that, upon completion of the first predetermined time, performs a subsequent primary volume track-to-secondary volume track comparison only on noncompare tracks; and
   a fourth executable portion that performs a query for determining whether all of the noncompare tracks have been resolved, wherein:
      if any of the noncompare tracks have not been resolved the fourth executable portion:
         performs a query for determining if a predetermined number of iterations of the primary volume track-to-secondary volume track comparison have been performed, and
         performs an additional subsequent primary volume track-to-secondary volume track comparison only on unresolved noncompare tracks.

20. The computer program product of claim 19, further including a fifth executable portion that, if all of the noncompare tracks have been resolved, reports that the asynchronous remote copy verification is successful.

21. The computer program product of claim 20, further including a sixth executable portion that:
   (a) waits an additional predetermined time, and
   (b) performs an additional subsequent primary volume track-to-secondary volume track comparison of the noncompare tracks.

22. The computer program product of claim 21, further including a seventh executable portion that repeats steps (a) and (b) for a predetermined number of iterations.

23. The computer program product of claim 21, further including a seventh executable portion that repeats steps (a) and (b) until each of the noncompare tracks are resolved.

24. The computer program product of claim 19, further including a fifth executable portion that repeats performs one of:
   recording differences between primary and secondary volume tracks as the noncompare tracks, and
   identifying at least one volatile and at least one persistent volatile noncompare track of the noncompare tracks by analyzing the initial primary volume track-to-secondary volume track comparison and the subsequent primary volume track-to-secondary volume track comparisons.

25. The computer program product of claim 24, further including a sixth executable portion that, for the identifying the at least one volatile noncompare track of the noncompare tracks by analyzing the initial primary volume track-to-secondary volume track comparison and the subsequent primary volume track-to-secondary volume track comparisons, performs each of:
   identifying at least one volatile noncompare track of the noncompare tracks by analyzing a additional subsequent primary volume track-to-secondary volume track comparisons,
   performing an initial primary volume record-to-secondary volume record comparison of the at least one volatile noncompare track between the primary and secondary volume pair,
   recording differences between the primary and the secondary volume track records as noncompare records,
   waiting a second predetermined time, and performing a subsequent primary volume record-to-primary volume record comparison of the noncompare records.

26. The computer program product of claim 24, further including a sixth executable portion that, for the identifying the at least one persistent volatile noncompare track of the noncompare tracks by analyzing the initial primary volume track-to-secondary volume track comparison and the subsequent primary volume track-to-secondary volume track comparisons, performs each of:

identifying at least one persistent volatile noncompare record of the noncompare tracks by analyzing a additional subsequent primary volume track-to-primary volume track comparisons, and determining if each persistent volatile noncompare record of the at least one persistent volatile noncompare record written to the secondary volume is changing over a second predetermined time, the determining at least partially used to provide verification of the at least one persistent volatile noncompare record.

27. The computer program product of claim 19, further including a fifth executable portion that continues to perform additional subsequent primary volume record-to-secondary volume record comparisons of the noncompare records after additional second predetermined times until the at least one volatile noncompare track is resolved.

* * * * *